United States Patent [19]
Fujita et al.

[11] Patent Number: 5,619,628
[45] Date of Patent: Apr. 8, 1997

[54] 3-DIMENSIONAL ANIMATION GENERATING APPARATUS

[75] Inventors: Takushi Fujita; Mitsuaki Fukuda; Chikako Matsumoto; Masaaki Oota; Hitoshi Matsumoto, all of Kawasaki; Shuro Shindo, Inagi; Waku Ooe, Inagi; Yuichi Nagai, Inagi, all of Japan

[73] Assignee: Fujitsu Limited, Kawasaki, Japan

[21] Appl. No.: 428,413

[22] Filed: Apr. 25, 1995

[30] Foreign Application Priority Data

Apr. 25, 1994 [JP] Japan ................................. 6-086779
Apr. 24, 1995 [JP] Japan ................................. 7-098570

[51] Int. Cl.$^6$ ................................................. G06T 17/00
[52] U.S. Cl. .......................... 395/127; 395/137; 395/138; 395/173
[58] Field of Search ................................. 395/152, 127, 395/137, 138; 382/300; 345/122

[56] References Cited

U.S. PATENT DOCUMENTS

| | | | |
|---|---|---|---|
| 4,600,919 | 7/1986 | Stern | 395/120 |
| 4,862,392 | 8/1989 | Steiner | 395/127 |
| 4,903,218 | 2/1990 | Longo et al. | 395/157 |
| 4,967,375 | 10/1990 | Pelham et al. | 395/166 |

*Primary Examiner*—Heather R. Herndon
*Assistant Examiner*—Stephen Hong
*Attorney, Agent, or Firm*—Staas & Halsey

[57] ABSTRACT

In a 3-dimensional animation generating apparatus which uses a computer, the user generates a number of static images having parent-child relationships and which serve as key frames in the sequence from the start to the end of the animation, a number of animation frames specified by the user being automatically inserted between the key frames by means of interpolation. In this 3-dimensional animation generating apparatus, the times of each of the key frames as specified by the user are stored, the parent object coordinates and child object coordinates generated by the user are stored in a world coordinate system, along with parent-child relationship in each of the key frames. When the 3-dimensional animation generating apparatus generates interpolated frames, the parent-child relationship in neighboring key frames in the time sequence is interpolated to first generate the parent-child relationship existing in the interpolated frame, after which the parent object coordinates in the interpolated frame are calculated in the world coordinate system by interpolating the parent object coordinates in each of the neighboring key frames. The coordinates of a child object in an interpolated frame are determined from the parent-child relationship within the interpolated frame and the parent object coordinates in the interpolated frame. The animation is thus generated from the interpolated frame parent object coordinates, the interpolated frame child object coordinates, and the parent-child relationship.

7 Claims, 10 Drawing Sheets

FIG. 7
| | PICTURE IN KEY FRAME #1 | RESULT OF INTER-POLATION | PICTURE IN KEY FRAME #2 |
|---|---|---|---|
| KEY FRAME DATA INPUT BY AN OPERATOR | 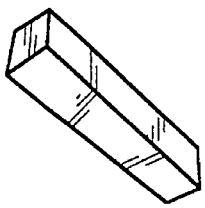 | | 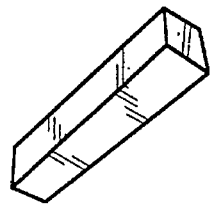 |
| RESULT OF INTERPOLATION BY THE PRESENT INVENTION | 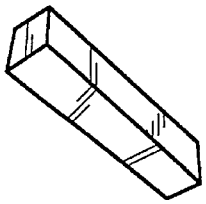 |  | 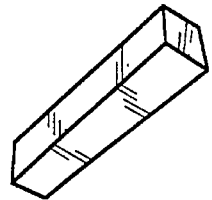 |
| RESULT OF INTERPOLATION BY USING EULERIAN ANGLES (PRIOR ART) | 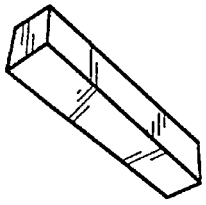 |  | 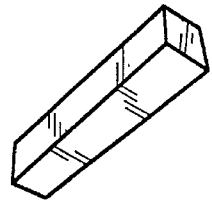 |
| RESULT OF LINEAR INTERPOLATION BY USING COORDINATE TRANSFORMATION MATRIX ELEMENT (PRIOR ART) | 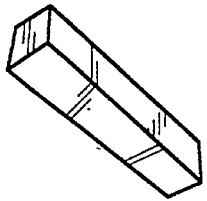 |  | 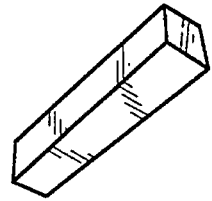 |

FIG. 9A

< DATA TABLE >

| | KEY FRAME K | KEY FRAME (K+1) | INTERPOLATED FRAME |
|---|---|---|---|
| FRAME INFORMATION | D1 · TIME OF KEY FRAME K | D2 · TIME OF KEY FRAME (K+1) | D3 · INTERPOLATION TIME |
| OBJECT LIST | (COORDINATE TRANSFORMATION MATRIX) | (COORDINATE TRANSFORMATION MATRIX) | |
| - OBJECT I (PARENT) | D4 · COORDINATE OF OBJECT I → WORLD COORDINATE SYSTEM | D5 · COORDINATE OF OBJECT I → WORLD COORDINATE SYSTEM | D6 · COORDINATE OF OBJECT I → WORLD COORDINATE SYSTEM |
| - OBJECT J (PARENT) | D7 · COORDINATE OF OBJECT J → WORLD COORDINATE SYSTEM | D8 · COORDINATE OF OBJECT J → WORLD COORDINATE SYSTEM | D9 · COORDINATE OF OBJECT J → WORLD COORDINATE SYSTEM |
| ⋮ | | | |
| OTHER DATA FOR INTERPOLATION | D10 - ATTRIBUTE DATA - LIGHT SOURCE DATA - CAMERA DATA - BACKGROUND COLOR DATA | D11 - ATTRIBUTE DATA - LIGHT SOURCE DATA - CAMERA DATA - BACKGROUND COLOR DATA | D12 - ATTRIBUTE DATA - LIGHT SOURCE DATA - CAMERA DATA - BACKGROUND COLOR DATA |

FIG. 9B

< WORK TABLE >

| TRANSFORMATION MATRIX FOR PARENT COORDINATE SYSTEM | D13 LOCAL COORDINATE SYSTEM → PARENT COORDINATE SYSTEM | D14 LOCAL COORDINATE SYSTEM → PARENT COORDINATE SYSTEM | D15 LOCAL COORDINATE SYSTEM → PARENT COORDINATE SYSTEM |
|---|---|---|---|

3-DIMENSIONAL ANIMATION GENERATING APPARATUS

BACKGROUND OF THE INVENTION

1. Field of the Invention

The present invention relates to a 3-dimensional animation generating apparatus, and more particularly to an apparatus which generates 3-dimensional animation using a computer, according to user instructions.

2. Description of the Related Art

In recent years, personal computers have been used to draw images in a 3-dimensional space. In generating images using this type of computer, the individual images which exist in the 3-dimensional spaced are known as objects. These include not only cube-shaped objects such as dice, but other objects of a variety of shapes. Objects can be, for example, a general rectangular parallelopiped having differing height, width, and depth, a sphere, a circular cylinder, or a cone. It is also possible to draw, for example, a robot or the like which is made up of a combination of these shapes. In addition, the orientation of such an object in a 3-dimensional space is determined in a basic coordinate system which is established beforehand in the computer, these coordinates being known as world coordinates.

When an object is moved a bit at a time, each position being displayed in sequence on a screen, the object appears as if it is moving. This method of expressing the movement of an object is known as animation. To achieve smooth-appearing motion, it is necessary to have at least approximately 30 static images per second.

However, it is difficult for a user to generate all the 3-dimensional animated images in sequence from the beginning to the end of a single animated sequence. Because of this difficulty, 3-dimensional animation generating apparatuses which use computers are devised so that it is sufficient for the user to generate a number of key static images (known as key frames) of the animated sequence. To achieve a smooth-appearing animation, the remaining images to be inserted between the key frames are automatically generated by the computer by means of interpolation processing.

An object of an animated picture can each be individually controlled by the user. In the case in which one shape is expressed by a number of objects, a parent-child relationship is established with respect to the group of objects. In this parent-child relationship, a given object is established as the parent, with other objects connected as children to that given object, this connection being called a link, the child objects connected to a parent object being handled together with the parent. Specifically, when the parent object moves, the child objects move simultaneously, and when the parent object rotates, the child objects rotate simultaneously, while maintaining their positional relationship to the parent.

In 3-dimensional animation, the case must also be considered in which parent-child related objects are continuously moved, this being expressed by a plurality of animated pictures. To achieve smooth movement of a parent-child related object between static images, interpolation processing is performed.

What follows is a description of a prior art 3-dimensional animation generating apparatus related to angle interpolation between key frames of an object, and interpolation between parent-child related objects.

(1) Establishing Key Frames

Key frames (static images) are generated by the user at a fixed time interval. The 3-dimensional animation generating apparatus automatically generates and inserts, between neighboring key frames in the time sequence, a given number of frames by means of interpolation of the data for the two key frames.

(2) Angle Interpolation Between Key Frames of the Object

In a prior art 3-dimensional animation generating apparatus the orientation of an object within a key frame was expressed in terms of three Euler angles, or the like. In such a prior art 3-dimensional animation generating apparatus, direct time interpolation of these angles was performed to establish the orientation of the object in interpolated frames.

(3) Interpolation of the Parent-Child Relationship of Objects

In a prior art animation generating apparatus, the coordinate system to which an object belongs is defined hierarchally, according to the parent-child relationship. In such a prior art animation generating apparatus, when interpolation is performed, a transformation matrix from the child coordinates to the parent coordinate is interpolated, these being synthesized to generate the object between key frames. Also, in a prior art animation generating apparatus, the child coordinate system is defined in terms of the parent coordinate system, so that if just the parent is moved it is not necessary to move the child. Furthermore, in a prior art animation generating apparatus, only the parent was defined in the world coordinate system.

However, in such a prior art animation generating apparatus, the following problems existed.

(a) With regard to setting key frames, because the interval between the frames was constant, it was not possible to specify detailed animation movements.

(b) With regard to angle interpolation between key frames, when Euler angle representation was used, for a given starting point and ending point the results of the interpolation would depend upon what orientation an object was to have in local coordinates. As a result, it was not possible to achieve the desired animation between certain key frames.

(c) When orientation of an object was expressed as angles (Euler angles, or the like) and those angles were interpolated, the interpolation results would be dependent upon the manner of establishing the local coordinates.

(d) To overcome the shortcoming (c), if the orientation of an object is expressed as a matrix, with direct linear interpolation being done on the matrix, unnatural distortion of the object resulting from the interpolation occurred.

(e) With regard to interpolation of the parent-child relationship, because the amount of processing required for a transformation from the lower most hierarchy level to the topmost level increases with an increasing hierarchy depth, it was difficult to generate detailed animation by means .of finely detailing the parent-child relationship.

(f) Because the position and orientation of an object was not defined in the world coordinate system but rather in terms of the local coordinate system of a parent object, when editing key frame data, it was necessary to calculate and correct position, dimension, and orientation data for an object.

(g) When editing was done with respect to a child object as well,.it was necessary to go back through the hierarchal structure in order to determine the coordinate system of the parent object.

SUMMARY OF THE INVENTION

An object of the parent invention is to provide an animation generating apparatus which generates high-quality animation with simple operations.

According to the present invention a 3-dimensional animation generating apparatus is provided wherein the period of a sequence from the start to the end of an animation is defined as one cut period, a group of static images as key frames of objects having a parent-child relationship is generated during this sequence time period, a computer which is capable of automatically generating by interpolation a number of frames specified by the user is used. These frames are inserted between each of the key frames. In this 3-dimensional animation generating apparatus, a time storage means stores the time of each of the key frames, a parent object coordinate storage means stores the coordinates of the parent objects in the key frames in the world coordinate system, a child object coordinate storage means stores the child objects in the key frames in the world coordinate system, a parent-child relationship storage means stores the parent-child relationship of parent objects and child objects in each of the key frames, an interpolated frame setting means set the interpolated frames between neighboring key frames in the time series, according to the number of animation pictures, an interpolated frame parent-child relationship processing means calculates using interpolation the parent-child in the interpolated frames from the parent-child relationships of neighboring key frames which are stored in the parent-child relationship storage means, an interpolated frame parent object coordinate calculation and storage means interpolates between the coordinates of each of the parent objects in neighboring key frames in the time sequence, thereby calculating and storing the coordinates of parent objects in the interpolated frame child object coordinate calculation and storage means calculates, from the parent-child relationship and the parent object coordinates in the interpolated frame, the world coordinate system coordinates of child objects in the interpolated frames, and an animation picture generating means generates animation pictures in the interpolated frames, according to the coordinates of the parent objects and the child objects in the interpolated frames and from the parent-child relationships.

In doing the above, it is possible for the parent-child relationship storage means to include a matrix which indicates the rules for transforming values from values which express the object in the local coordinate system of a child object to values which express the object in the local coordinate system of a parent object, the interpolated frame parent-child relationship calculation and storage means including a transformation matrix which determines the matrices stored in the parent-child relationship storage means for neighboring key frames in the time sequence, and the interpolated frame child object coordinate calculation and storage means calculating the world coordinate system values which express child objects which are to exist in the interpolated frame, using the calculated parent object coordinates in the interpolated frames and the generated interpolated frame matrices.

It is also possible to have, additionally, an animation picture generating means which has a position and dimension interpolation means which performs linear interpolation of the position and dimensions of objects existing within neighboring key frames in a time sequence to calculate the position and dimensions of objects which are to exist in interpolated frames which are to be inserted between key frames, a rotating axis angle calculation means which determines a rotational transformation matrix between rotational matrices by which the orientation of the objects existing in the neighboring key frames are defined in the world coordinate system and calculates from this rotational transformation matrix the rotational axis of both objects and the rotational angle between the objects, a rotational matrix generating means which determines the interpolation between the rotation angle of an object to exist in an interpolated frame with respect to the immediately previous key frame, determining the rotational transformation matrix which causes rotation of this object by the calculated angle, this rotational transformation matrix and the rotational matrix of the object in the immediately previous key frame being combined to generate a rotational matrix by which the orientation of the object to exist in the interpolated frame is defined in world coordinates.

According to the present invention, because angle interpolation is performed uniquely without dependency on a particular coordinate system, it is possible to automatically generate the desired animation.

Furthermore, according to the present invention, because it is possible to directly perform transformation processing from a lower hierarchy level to the uppermost level, without having to back-track along the hierarchy structure, it is possible to greatly reduce the amount of processing performed in generating animation with greatly enhanced definition in the parent-child relationships. That is, the position, orientation, and dimension data of objects is defined in the world coordinate system and used as is, this being advantageous when performing generated and editing of key frame data, and enabling interpolation in which the proper representation of parent-child relationship is maintained.

By doing this, an improvement is achieved in the process of editing key frame data, including facilitation of changes in the parent-child relationship and editing of child objects.

BRIEF DESCRIPTION OF THE DRAWINGS

The present invention will be more clearly understood from the description as set forth below, with reference being made to the following attached drawings.

FIG. 7 is a table which shows neighboring key frames which are input by an operator, the interpolated frames resulting from interpolation in accordance with the present invention, the interpolated frames resulting from interpolation by means of Eulerian angles used in the prior art, and interpolated frames resulting from interpolation using a coordinate transformation matrix element of the prior art.

FIG. 9A is a drawing which shows the parent-child related image hierarchal data for two key frames which is stored in a data table.

FIG. 9B is a drawing which shows the parent-child related image hierarchal data for two key frames which is stored in a work table.

DESCRIPTION OF THE PREFERRED EMBODIMENT

Figure 1:
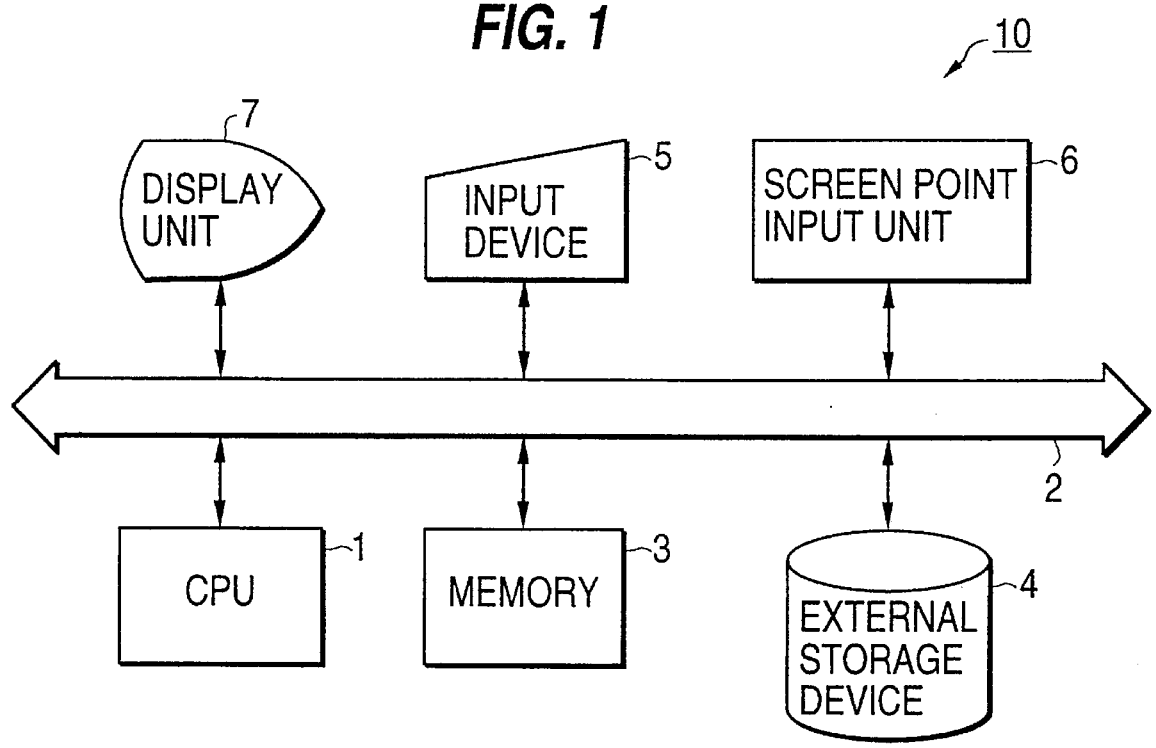
FIG. 1 is a block diagram which shows the configuration of an animation generating apparatus according to the present invention.

FIG. 1 is a block diagram which shows the configuration of an animation generating apparatus 10 to which the present invention has been applied. The animation generating apparatus according to the present invention is implemented by a computer system having a CUP 1, a bus 2, a memory 3, an external storage device 4, an input device 5, such as a keyboard or the like, a screen point input unit 6, such as a mouse, a tablet or the like, and a display unit 7, and a program which runs on this computer system.

In the animation generating apparatus according to the present invention, a program is located in the memory 3, the CPU 1 runs the program is located in the memory 3, the CPU 1 runs the program to generate animations. When generating animations, data is placed in the memory 3, and when data is to be stored, it is stored in the external storage device 4.

The mouse or tablet used as the screen point input unit 6 is used to input a specific point on the display unit 7, and in addition to enabling movement of the specified position (cursor display position) on the screen by moving the screen point input unit 7, button operations can be used to verify input.

Figure 2:
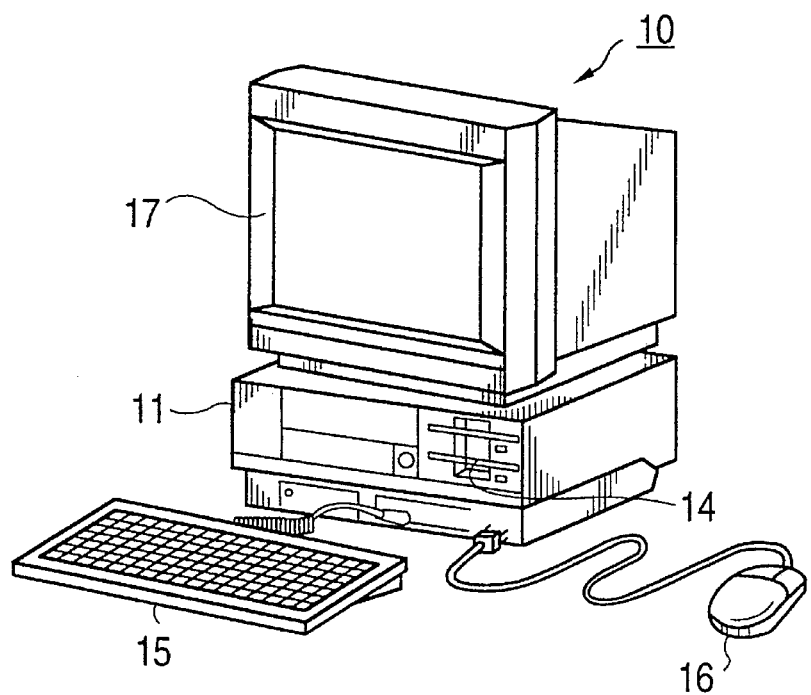
FIG. 2 is a perspective view which shows the outer appearance of the animation generating apparatus shown in FIG. 1.

FIG. 2 is a perspective view of the outer appearance of the animation generating apparatus 10 shown in FIG. 1. The animation generating apparatus 10 has a computer 11 and a CRT display 17 as the display unit, computer 11 having a keyboard 15 and a mouse 16, which serves as the screen point input unit connected to it. The computer 11 has internally the CPU 1, the bus 2, and the memory 3 which are shown in FIG. 1, and has, as external storage devices, a hard disk drive (not shown in the drawing) and a floppy disk drive 14. The input instructions from the user are given to the computer 11 by means of the keyboard 15 and mouse 16, and the animation is drawn on the CRT display 17.

Figure 3:
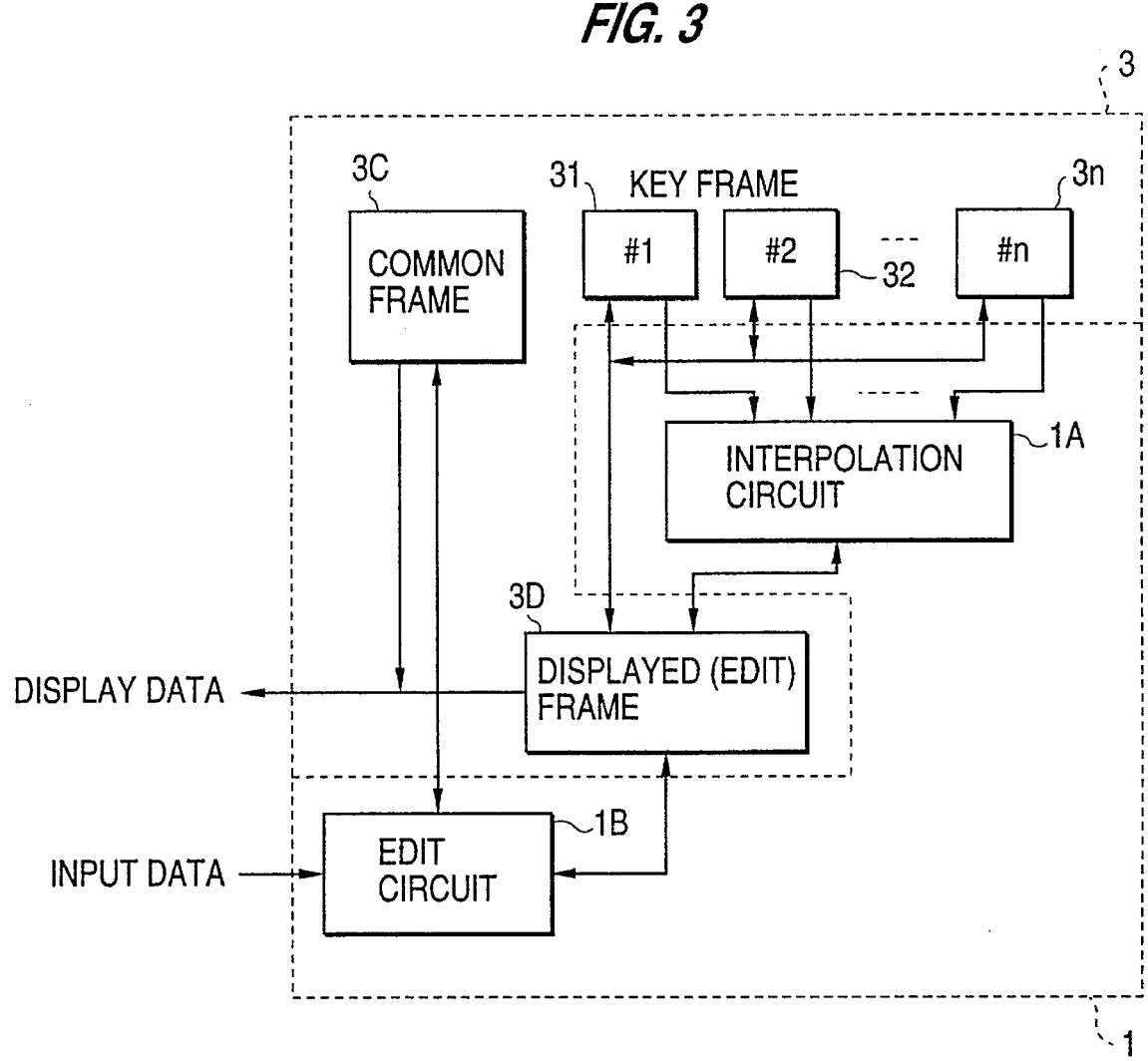
FIG. 3 is a block diagram which shows a functional block representation of the CPU and memory shown in FIG. 1.

FIG. 3 is a block diagram which shows the functional blocks of the CPU 1 and memory 3 shown in FIG. 1. The memory 3 has storage areas 31 to 3n, into which are stored the n key frames from key frame #1 to key frame #n, a common frame storage area 3C, into which are stored data which is common to key frame #1 to key frame #n, and a display (edit) frame storage area 3D. The CPU 1 has an interpolation circuit 1A which has a function that generates interpolated frames between key frame K and key frame K+1 of the key frames #1 to #n, and an edit circuit in which a function capable of editing, in accordance with input data, any key frame from key frame #1 to key frame #n. The display (edit) frame 3D is a frame which is newly created by means of interpolating between neighboring key frames, and is a temporary storage of the results of the interpolation. Key frame data during editing is also stored in the display (edit) frame 3D.

Figure 4A:
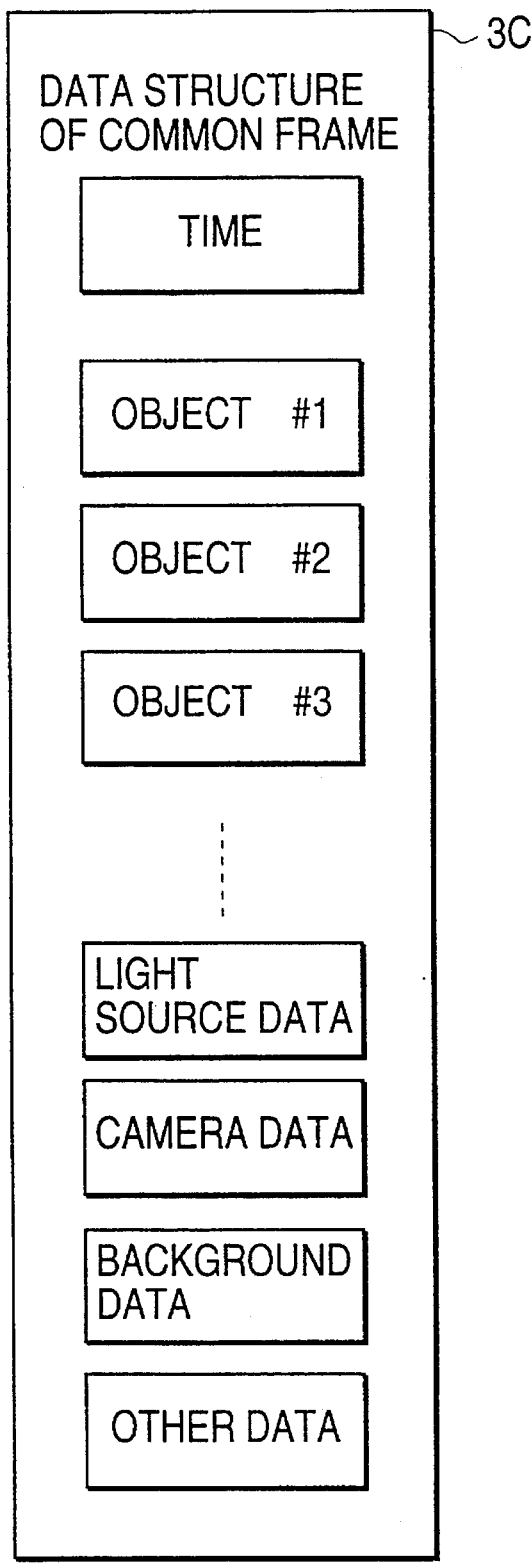
FIG. 4A is a block diagram which shows structure of data stored in the common frames storage area shown in FIG. 3.

FIG. 4A is a block diagram which shows the structure of animation data stored in the common frame storage area 3C to FIG. 3. Into the common frame storage area 3C is stored the time data which is common to the key frames 31 to 3n and the display (edit) frame 3D, data of an object existing within a frame, light source data, camera data, background data, and other data.

The data stored in the common frame storage area 3C is the fixed data in each of the key frames. Details of each data is as follows.

(1) object data: a data which indicates a detailed shape of the object such as the coordinate value;

(2) light source data: a data which indicates a variety of light sources, such as a point light source or a line light source;

(3) camera data: a data which indicates the coordinate values of eye point, a line of sight (direction), an angle of visibility (range of visual field), and the like when the eye point is fixed (Note that camera data is different in each of the key frames so that pointers indicating the camera data of each key frame are stored as a common data); and (4) background data: a data which indicates the color of the background such as red, green, and blue data when the color of the background is fixed (Note that pointers are stored if the background is not fixed as is the same as the camera data).

Figure 4B:
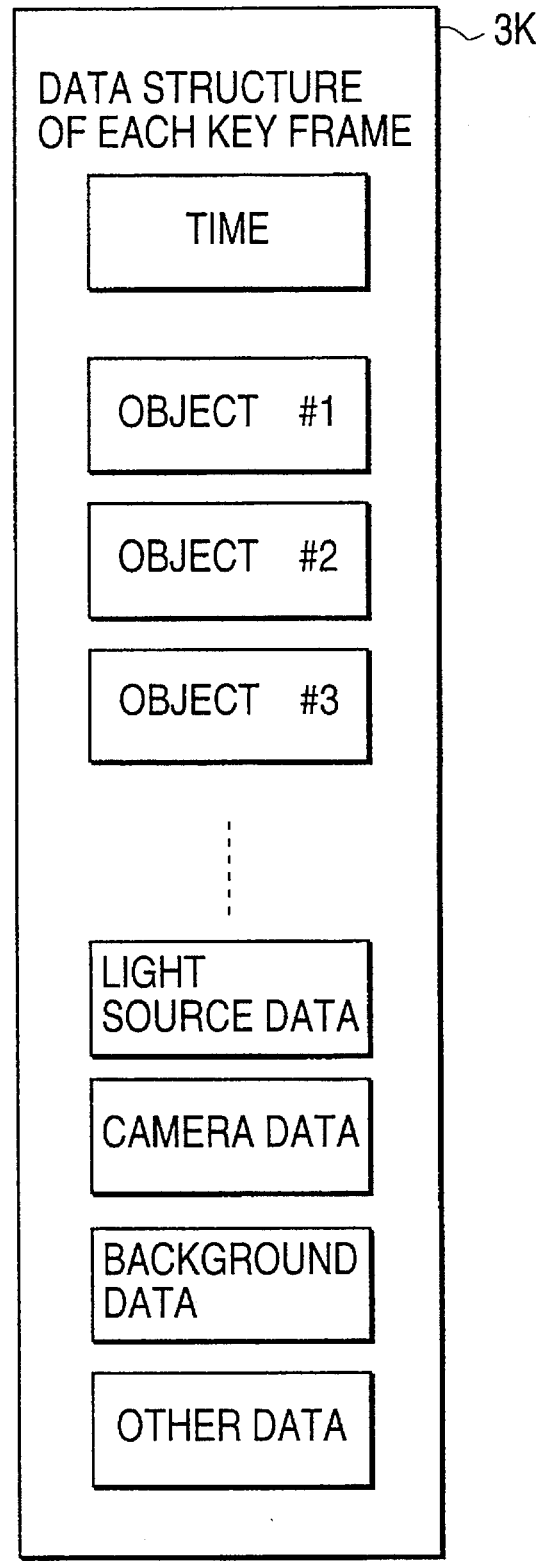
FIG. 4B is a block diagram which shows the structure of the data stored in each of the key frame storage areas.

FIG. 4B is a block diagram which shows the structure of the data stored in the key frames 31 to 3n and the display (edit) frame of FIG. 3, this illustrating the example of the structure of the animation data for the key frame K. The data structure of each storage area 3D is the same as the storage area 3C data structure.

The data stored in the key frames 31 to 3n is the varying data between key frames. Details of each data is as follows:

(1) object data: a data which indicates a position of the object in the space, a matrix for deciding a direction of the object, and the like;

(2) light source data: a data which indicates a position, a color of the light source, and the like;

(3) camera data: a data which indicates the coordinate values of eye point, a line of sight (direction), an angle of visibility (range of visual field), and the like when the eye point is not fixed; and (4) background data: a data which indicates the color of the background, such as red, green, and blue data when the color of the background is not fixed.

Figure 5:
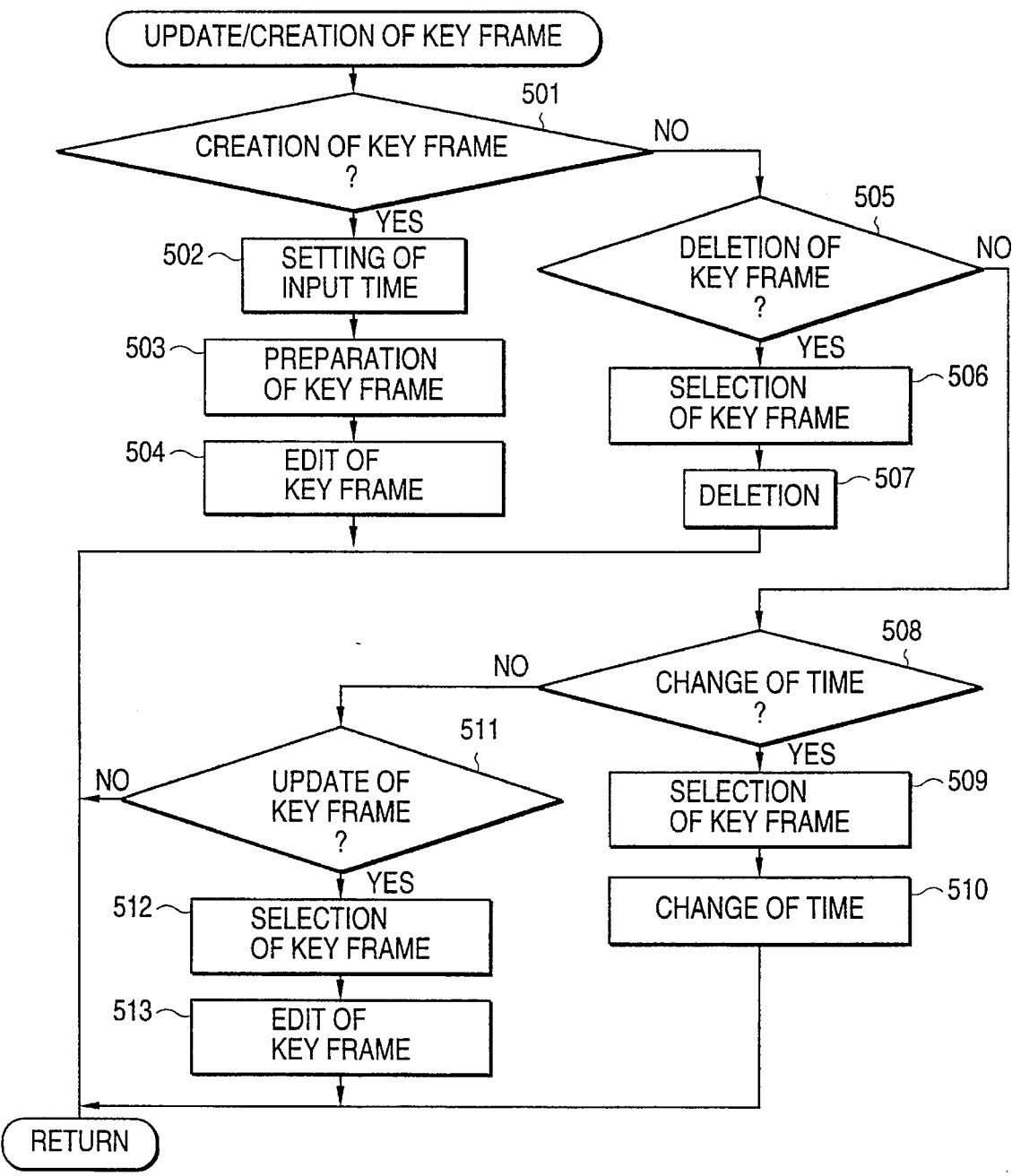
FIG. 5 is a flowchart which shows the procedure for generating and updating key frames in the animation generating apparatus according to the present invention.

FIG. 5 is a flowchart which shows the procedure for performing generation and update of a key frame in the animation generating apparatus 10 according to the present invention.

At step 501 a test is made as to whether or not a key frame generation instruction exists. In the case of an instruction to create a new key frame, control proceeds to step 502, at which the user's time input is accepted. At the next step 503, the key frames immediately before and after the accepted time are prepared, the data for the thus-prepared key frames being time interpolated to automatically create new key frame data. In the case in which there is only a key frame existing either immediately before or immediately after the specified time, the key frame data from the immediately previous or subsequent key frame is copied as is. At step 504 the automatically generated key frame data is edited in accordance with user input and this routine is ended.

Turning to step 501, if a determination is made at this step that the instruction is not an instruction to create a new key frame, control proceeds to step 505, at which a test is made as to whether or not the instruction is an instruction to delete an existing key frame. In the case of deleting an existing key frame, control proceeds to step 509, at which the key frame to be deleted is selected in accordance with user input. The deletion of the selected frame is performed at step 507, after which the routine is ended.

At step 505, if a determination is made that the instruction is not an instruction to delete an existing key frame, control proceeds to step 508, at which a test is made as to whether the instruction is an instruction to change the time of a key frame. If the instruction was one to change the time of a key frame, control proceeds to step 509, at which the key frame to have its time changed is selected in accordance with user input. At the subsequent step 510, the time of the selected key frame is changed, and the routine is ended.

In addition, if at step 508 the instruction was not an instruction to change the time of a key frame, control proceeds to step 511, at which a test is made as to whether an instruction has been input to change a key frame. If an instruction was given to change an existing key frame, control proceeds to step 512, at which the key frame to be changed is selected in accordance with user input. Then at step 513 the selected key frame is changed in accordance with user input, and the routine is ended.

Figure 6:
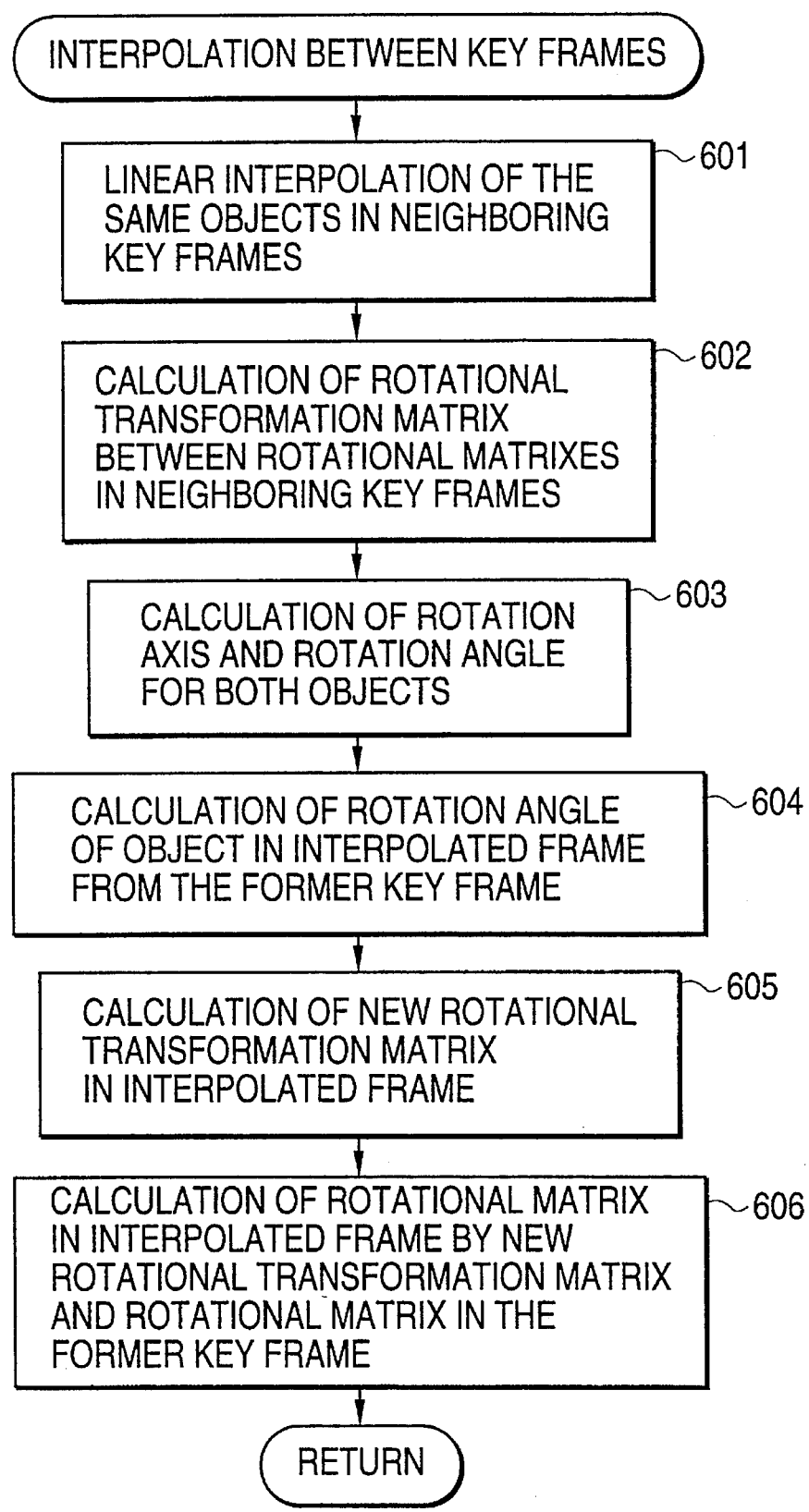
FIG. 6 is a flowchart which shows the interpolation processing procedure in the case of inserting interpolated frame between neighboring key frames.

FIG. 6 is a flowchart which shows the procedure for performing interpolation when an interpolated frame is to be inserted between neighboring key frames.

First, at step 601 direct linear interpolation using the time ratio is performed of the positions and dimensions of objects existing in neighboring key frames. Then, the positions and dimensions of objects existing in the newly created interpolated frame (the display frame to be inserted between the neighboring key frames) are calculated.

Next, at step 602 the rotational transformation matrix between rotational matrices in neighboring key frames is calculated from the rotational matrices in the neighboring key frames in which the same object exists. The rotational matrices for each object defines the orientation of each object as referenced to the world coordinate system. The thus determined rotational transformation matrix indicates the change in orientation between the key frames before and after the interpolated frame.

At step 603 the rotation axis and rotation angle between both objects is determined from the rotational transformation matrix determined at step 602. And at step 604 a linear time interpolation is performed between the rotational angles determined at step 603, thereby determining the angle of rotation of the object in the newly created interpolated frame with respect to the immediately previous key frame.

At step 605, the rotational transformation matrix which causes rotation of the object by this angle about the determined rotation axis is determined. Finally, at step 606, by combining this rotational transformation matrix and the rotational matrix of the object in the immediately previous frame are combined to generate the rotational matrix of the object in the interpolated frame. When this rotational matrix is created, the orientation of the object in the interpolated frame is defined in the world coordinate system.

FIG. 7 is a table which shows a comparison of the images of key frames #1 and #2 which are input by an operator, the interpolated frames resulting from interpolation in accordance with the present invention, the interpolated frames resulting from interpolation by means of Eulerian angles used in the prior art, and interpolated frames resulting from interpolation using a coordinate transformation matrix element of the prior art.

When the key frame #1 and key frame #2 images are created by the operator (user) as shown in the first section at the top of FIG. 7, the change in orientation from key frame #1 to key frame #2 can be done by rotation about a single axis. This axis is uniquely given based on the coordinate transformation matrix which defines the positions of the objects in the two frames, without dependency on the method in which the coordinate system is established. Thus, in the interpolation performed in an animation generating apparatus according to the present invention, the results of the interpolation are, as shown in the second section of the table of FIG. 7, a natural and smooth representation of the desired animation.

In contrast to this, as shown in the third section of FIG. 7, when using Eulerian angles to perform linear interpolation in the prior art, the results of the interpolation depend on the method of establishing the coordinate axes. In some cases, as shown in FIG. 7, the rotation axis of the object differs between key frames, making the generated animation appear unnatural. To avoid this, care is required in establishing the coordinate system, and the task is quite difficult.

In addition, in the prior art interpolation method shown in the fourth section of the table of FIG. 7, elements of a coordinate transformation matrix which define a 3-dimensional position are linearly interpolated between key frames. In this method, while the interpolation results do not have a dependency on the method of establishing the coordinate system, a shortcoming of the system is that an object resulting from the interpolation appears smaller than the original object. As a result, it is not possible to obtain smooth-appearing animation using this method.

Figure 8A:
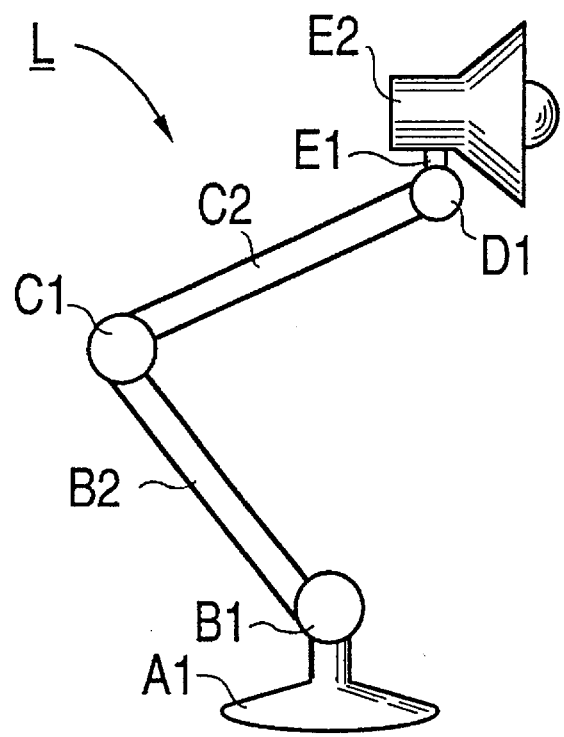
FIG. 8A and FIG. 8B are perspective views which illustrate the parent-child relationships in an electric lamp.
Figure 8B:
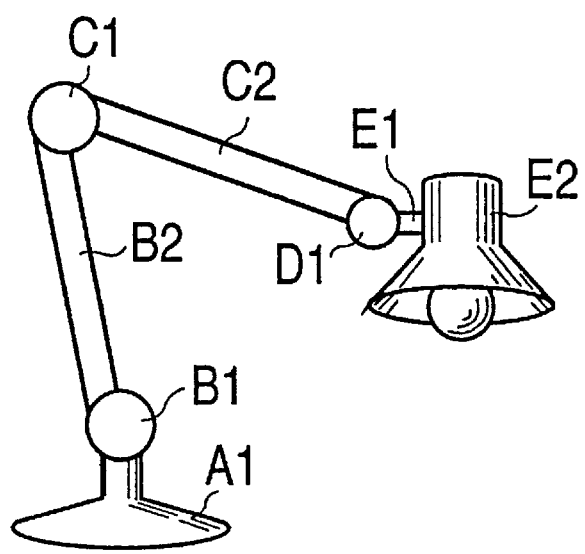

FIGS. 8A and 8B are perspective views of an electric lamp, used here to illustrate the parent-child relationship of an image drawn in a key frame. In the model L of the electric lamp shown in FIG. 8A, base AI is the parent, with other parts being children. In this model, when the base AI, which is the parent, is moved, the other parts move in concert with the base AI. A part that is directly linked to the base AI is the first joint B1, which has connected to it the first arm B2. Further, connected in sequence to and beyond the first arm B2 are a second joint C1, a second arm C2, a third joint D1, a third arm E1, and finally the lamp section E2. Therefore, the parent-child relationship is also in this sequence. For example, when movement is made from the condition shown in FIG. 8A to the condition shown in FIG. 8B, the second joint C1, the second arm C2, the third joint D1, the third arm E1, and the lamp section E2 move accordingly.

FIG. 9A is a drawing which illustrates a data table into which is stored hierarchal structure data of parent-child relates images drawn in two key frames, and FIG. 9B is a drawing which illustrates a work table into which is stored hierarchal structure data of parent-child related images drawn in two key frames. In this manner, the tables into which hierarchal structure data is stored are split into a data table and a work table, these being divided in the tables into a storage area for storing data related to key frame K and key frame K+1 (where k is 1 to n), which are mutually neighboring, and a storage area for storing data related to interpolated frames.

The data table has storage area for storage of frame information for key frame k, key frame (k+1), and interpolated frames, object list (coordinate transformation matrix) data, and other data to be interpolated. The frame information area has write fields for the time D1 of the key frame k, the time D2 of key frame (k+1), and the interpolation time D3. The object list (coordinate transformation) data area has write fields for the coordinate systems D4, D5, and D6 of object I and coordinate systems D7, D8, and D9 of object J which belong to these coordinate systems. In addition, the other data-to-be-interpolated area has write fields D10, D11, and D12 for attribute data, light source data, camera data, and background data. In FIG. 9A, the hierarchal structure satisfies the condition that the object I is the parent, with the object J being the child. The work table shown in FIG. 9B has stored in it the matrix data D13, D14, and D15 which transforms the local coordinate system of the child to the parent coordinate system.

Figure 10:
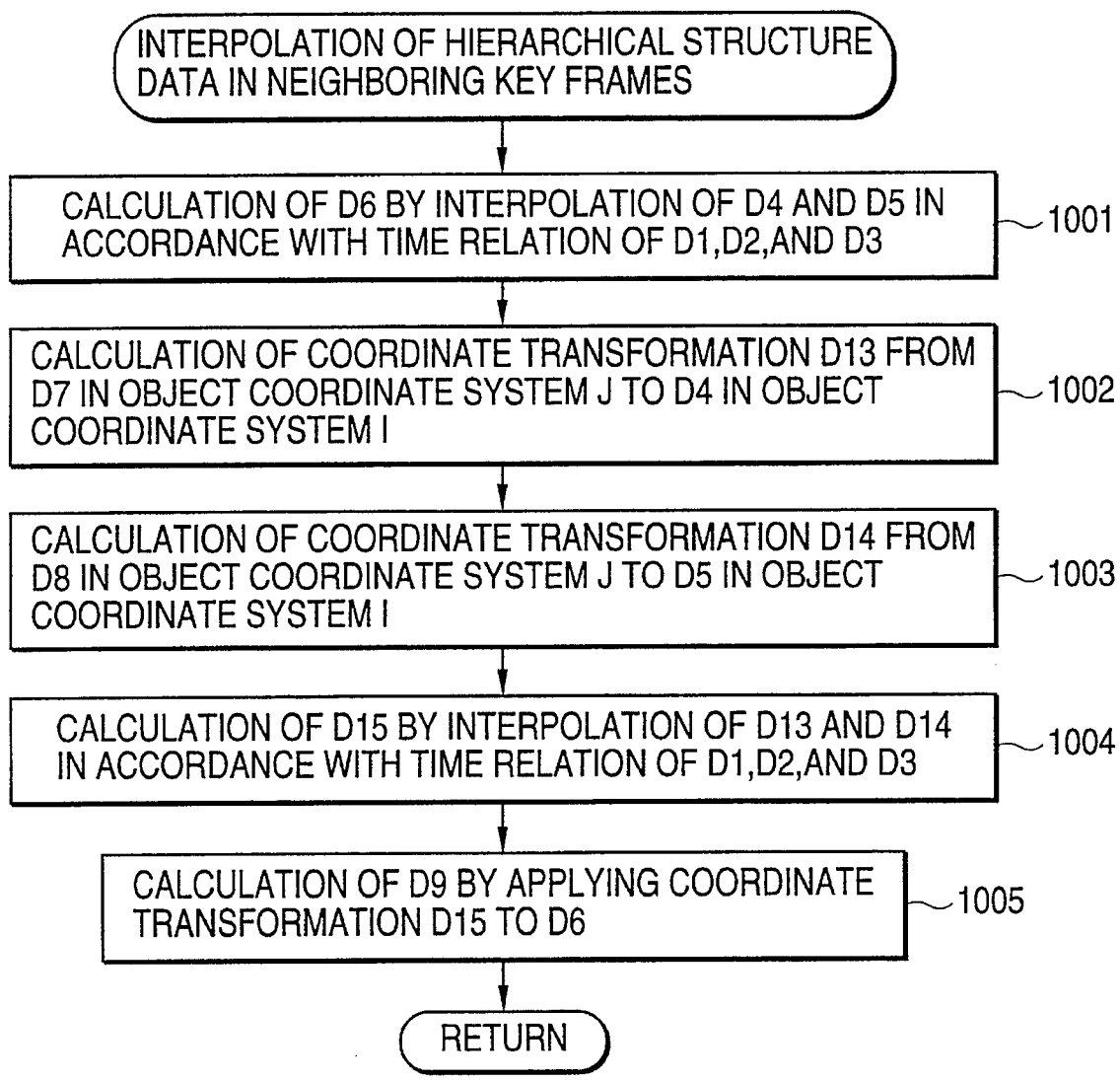
FIG. 10 is a flowchart which shows the procedure for performing interpolation processing of hierarchal data when inserting an interpolated frame between two neighboring key frames.

FIG. 10 is a flowchart which shows the process of interpolating between hierarchally structured data when inserting an interpolated frame between neighboring key frames.

At step 1001, the time data coordinate transformation matrix D6 is calculated by time interpolation of the coordinate transformation matrix data D4 and D5, in accordance with the time relationships of the time data D1 of the key frame k immediately before the interpolated frame, the time data D2 of the key frame (k+1) immediately after the interpolated frame, and the time data D3 of the interpolated frame.

Next, at step 1002, the coordinate transformation matrix D13 which transforms from the child object J coordinate system D7 to the parent object I coordinate system D4, is calculated using the coordinate transformation matrices D4 and D7 related to the key frame K of parent object I and child object J. Then, at step 1003, the coordinate transformation matrix D14 which transforms from the child object J coordinate system D8 to the parent object I coordinate system D5 is calculated using the coordinate transformation matrices D5 and D8 related to the keyframe (k+1) parent object I and child object J. The transformation matrices D13 and D14 are stored in the work table.

In addition, at step 1004, a time interpolation of the transformation matrices D13 and D14 is performed based on the relationship of the times D1, D2, and D3, with the transformation matrix D15 which transforms from the child object J to the parent object I in the interpolated frame being determined and stored in the work table.

Finally, at sep 1005, the coordinate transformation matrix D6 is combined with the transformation matrix D15 to calculate the coordinate transformation matrix data D9 related to the child object in the interpolated frame.

Figure 11A:
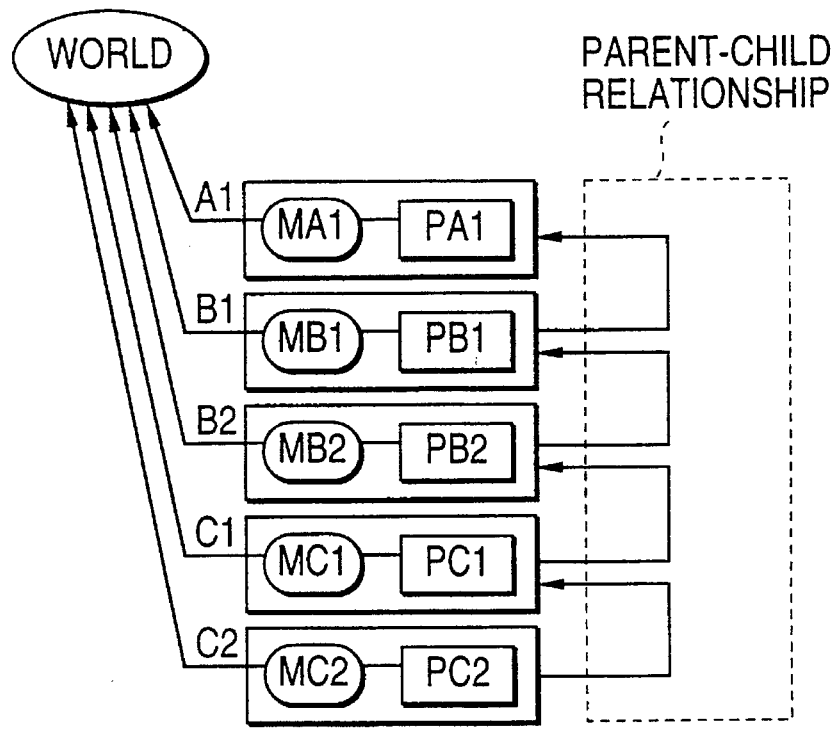
FIG. 11A is a drawing which illustrates the relationships between the coordinate transformation matrices, the detailed shape data of an object, and the parent-child relationship world coordinate system in an animation generating apparatus according to the present invention.
Figure 11B:
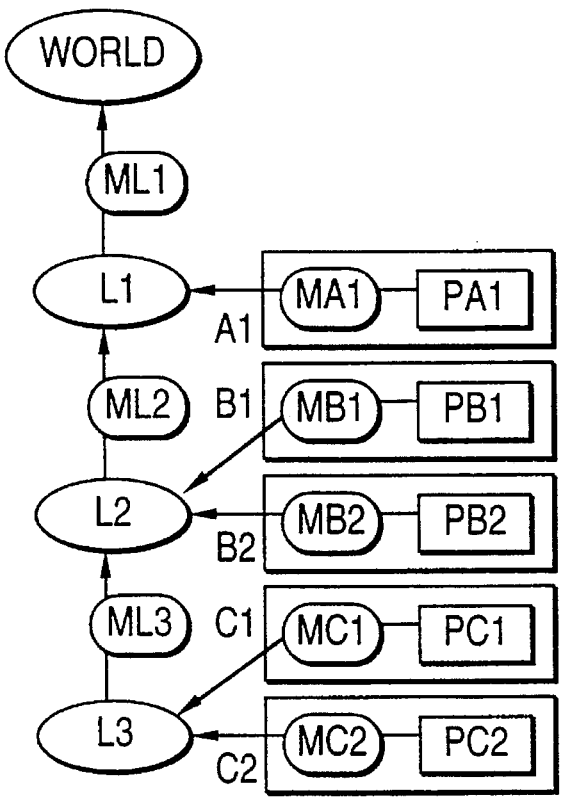
FIG. 11B is a drawing which illustrates the relationships between the coordinate transformation matrices, the detailed shape data of an object, the local coordinate system and the world coordinate system in an animation generating apparatus of the prior art.

FIG. 11A is a drawing which illustrates the relationships between the coordinate transformation matrices, detailed shape data, and the parent-child related world coordinate system in an animation generating apparatus according to the present invention. FIG. 11B show the relationships between the coordinate transformation matrices, detailed shape data, the local coordinate system, and the world coordinate system in an animation generating apparatus of the prior art.

In the prior art method shown in FIG. 11B, a hierarchal coordinate system is defined, with the position of each part defined with respect to this coordinate system. Next, the hierarchal structure shown in FIG. 11B will be described in its application to the electric lamp which is shown in FIG. 8A. Referring to FIG. 11B, data is defined in such a manner that the base A1, the first joint B1, the first arm B2, the second joint C1, and the second arm C2 belong to the local coordinate system L1, L2, and L3, thus linking together the first joint B1, the first arm B2, the second joint C1, and the second arm C2 as one. The position of each part in its respective local coordinate system is defined by means of a coordinate transformation matrix, the detailed shape of each being defined by detailed shape data. When displaying an object, the object data which is defined in terms of the local coordinate system is sequentially transformed to the local coordinate system of successively high hierarchal levels, ultimately being transformed to the world coordinate system.

However, in this prior art method, when hierarchy of the parent-child relationship becomes deep, the calculation burden for coordinate transformation becomes heavy. In addition, when the parent-child relationship is changed, it is necessary to determine anew the coordinate transformation matrix for each part.

In contrast to this, with the data structure of the present invention as shown in FIG. 11A, the position of all parts is defined by means of a coordinate transformation matrix for the purpose of positioning detailed shapes in the world coordinate system. The parent-child relationships are defined completely independently from the coordinate transformation matrix. By doing this, coordinate transformation need be performed only once for each object when performing, for example, object display. In addition even if the parent-child relationship is changed, it is not necessary to determine the coordinate transformation matrix anew.

It can be understood from the above-described embodiment of the present invention, that the present invention offers:

the ability to input a key frame at an arbitrary time;

the ability to automatically prepare a frame to be newly input and to correct the newly input frame and existing frames;

the ability to update the time of key frames as well; and the ability to re-arrange the sequence of key frames.

In addition, when creating new interpolated frames using the present invention, because the angle interpolation, between key frames that are temporally before and after, is performed with reference to the world coordinate system, it is possible to generate the desired animation with natural-appearing motion.

Because in the present invention it is possible to perform direct transformation of the coordinate system from a lower hierarchal level to the uppermost level without back-tracking through the hierarchal structure, it is possible to greatly reduce the amount of processing performed in generating animation with greatly enhanced definition in the parent-child relationships. That is, editing efficiency is greatly improved, as typified by the elimination of the need to back-track through the hierarchal structure when generating or editing a key frame and the ease with which the parent-child relationship can be changed.

As a result, the present invention provides the ability to efficiently generate animation which has superior rendering capability, natural-appearing motion, and highly detailed motion.

What is claimed is:

1. A 3-dimensional animation generating apparatus using a computer system which is capable of automatically generating a number of frames specified by the user by interpolation, these to be placed between each of key frames, under the condition that a plurality of static images of objects having a parent-child relationship are generated as said key frames during one cut period which is defined to be a sequence from start to end of an animation motion, comprising:

means for time storage which stores the time of each of the key frames;

means for parent object coordinate storage which stores parent object coordinates of parent objects in each of the key frames in a world coordinate system;

means for child object coordinate storage which stores child object coordinates of child objects in each of the key frames in the world coordinate system;

means for parent-child relationship storage which stores parent-child relationships of the parent objects and the child objects in each of the key frames;

means for setting an interpolated frame which sets interpolated frames between neighboring key frames in a time series according to data which indicates the number of interpolated frames;

means for calculating an interpolated frame parent-child relationship using interpolation of the parent-child relationships in the neighboring key frames in the time series;

means for calculating and storing the parent object coordinates of the interpolated frame in the world coordinate system by performing interpolation of neighboring key frames in the time series;

means for calculating the child object coordinates of the interpolated frame in the world coordinate system and calculating and storing the child object coordinates from the parent-child relationship in the interpolated frame and from the parent object coordinates; and means for generating an animated picture which generates an animated picture according to the parent object coordinates in the interpolated frame, the child object coordinates in the interpolated frame, and the parent-child relationship.

2. An animation generating apparatus according to claim 1, wherein:

said means for parent-child relationship storage includes a matrix which indicates the rules for transforming values from values which express the object in the local coordinate system of a child object to values which express the object in the local coordinate system of a parent object;

said means for calculating an interpolated frame parent-child relationship determines the matrices stored in said means for parent-child relationship storage for said neighboring key frames and includes means for generating a transformation matrix for said interpolated frame by interpolation of each of said matrices; and said means for calculating the child object coordinates of said interpolated frame calculates values which express child objects to exist in said interpolated frame in the world coordinate system, using parent object coordinates in said interpolated frame and the generated interpolated frame matrix.

3. An animation generating apparatus according to claim 2, wherein said means for generating an animated picture further comprises:

means for position and dimension interpolation which performs linear interpolation of the position and dimensions of objects existing within neighboring key frames in the time series to calculate the position and dimensions of objects which are to exist in said interpolated frames which are to be inserted between key frames;

means for calculating a rotating axis angle which determines a rotational transformation matrix between rotational matrices by which the orientation of objects existing in the neighboring key frames are defined in the world coordinate system and calculates from this rotational transformation matrix the rotational axis of both objects and the rotational angle between the objects; and means for rotational matrix generation which determines the interpolation between the rotation angle of an object to exist in said interpolated frame with respect to an immediately previous key frame, determining the rotational transformation matrix which causes rotation of this object by the calculated angle, this rotational transformation matrix and the rotational matrix of the object in the immediately previous key frame being combined to generate a rotational matrix by which the orientation of the object to exist in the interpolated frame is defined in the world coordinate system.

4. A method for generating a 3-dimensional animation using a computer, comprising the steps of:

defining, for each parent and child object in a key frame, coordinate transformation data in a world coordinate system and parent-child relationship data; and producing an in-between frame between a pair of key frames based on the coordinate transformation data and the parent-child relationship data.

5. A method for generating a 3-dimensional animation using a computer, comprising the steps of:

defining key frames of static images of parent and child objects, each frame having time data, and each of the parent and child objects having coordinate transformation data in a world coordinate system, and parent-child relationship data;

specifying a number of interpolated frames to be inserted between the key frames;

calculating the parent-child relationship data in neighboring key frames based on the coordinate transformation data for each of the parent and child objects in the neighboring key frames;

interpolating the parent-child relationship data in the neighboring key frames based on the time data of each key frame to generate the parent-child relationship data of the interpolated frames;

interpolating the parent object coordinate transformation data in neighboring key frames to calculate the parent object coordinate transformation data of the interpolated frames; and, combining the parent-child relationship data of the interpolated frames with the parent object coordinate transformation data of the interpolated frames to calculate the child object coordinate transformation data of the interpolated frames.

6. An apparatus generating a 3-dimensional animation, comprising:

a memory storing key frames having parent and child objects, each object having coordinate transformation data in a world coordinate system and parent-child relationship data; and a processor producing an in-between frame to be inserted between key frames based on the coordinate transformation data and the parent-child relationship data.

7. An apparatus to generate a 3-dimensional animation, comprising:

a memory to store key frames of static images of parent and child objects, each frame having time data, and each object having coordinate transformation data in a world coordinate system, and parent-child relationship data; and a processor to interpolate the parent-child relationship data in neighboring key frames based on the time data of each key frame to generate the parent-child relationship data of interpolated frames to be inserted between the key frames, to calculate the parent-child relationship data in neighboring key frames based on the coordinate transformation data for each of the parent and child objects in the neighboring key frames, to interpolate the parent object coordinate transformation data in neighboring key frames to calculate the parent object coordinate transformation data of the interpolated frames, and to combine the parent-child relationship data of the interpolated frames with the parent object coordinate transformation data of the interpolated frames to calculate the child object coordinate transformation data of the interpolated frames.

* * * * *

UNITED STATES PATENT AND TRADEMARK OFFICE
CERTIFICATE OF CORRECTION

PATENT NO. : 5,619,628
DATED : Apr. 8, 1997
INVENTOR(S) : FUJITA et al.

It is certified that error appears in the above-indentified patent and that said Letters Patent is hereby corrected as shown below:

TITLE PAGE: [54] and col. 1, delete title and replace with the following:

--APPARATUS AND METHOD FOR INTERPOLATING KEY FRAMES CONTAINING PARENT AND CHILD OBJECTS DEFINED IN WORLD COORDINATE SYSTEM--

Signed and Sealed this

Twelfth Day of August, 1997

Attest:

BRUCE LEHMAN

Attesting Officer

Commissioner of Patents and Trademarks